United States Patent [19]

Frew et al.

[11] Patent Number: 4,717,493

[45] Date of Patent: * Jan. 5, 1988

[54] PREPARATION OF MAGNETIC COATING

[75] Inventors: Duncan W. Frew, Alamo; Zorro Stefanini, San Jose; Edward A. Schnee, Byron; Leo di Ricco, San Jose, all of Calif.

[73] Assignee: Unisys Corporation, Detroit, Mich.

[ * ] Notice: The portion of the term of this patent subsequent to Dec. 6, 2000 has been disclaimed.

[21] Appl. No.: 914,522

[22] Filed: Oct. 3, 1986

Related U.S. Application Data

[63] Continuation of Ser. No. 495,554, May 17, 1983, abandoned.

[51] Int. Cl.$^4$ .............................................. H01F 1/02
[52] U.S. Cl. .................................................... 252/62.54
[58] Field of Search ....................................... 252/62.54

[56] References Cited

U.S. PATENT DOCUMENTS

| | | | |
|---|---|---|---|
| 3,474,073 | 10/1969 | Higashi | 252/62.54 |
| 3,586,630 | 6/1971 | Ingersoll | 252/62.54 |
| 3,894,970 | 7/1975 | Adams | 252/62.54 |
| 4,018,967 | 4/1977 | Roller et al. | 252/62.54 |
| 4,018,968 | 4/1977 | Neumann et al. | 252/62.54 |
| 4,020,236 | 4/1977 | Aonuma et al. | 252/62.54 |
| 4,145,300 | 3/1979 | Hendriks | 252/62.54 |
| 4,419,257 | 12/1983 | Frew et al. | 252/62.54 |
| 4,507,217 | 3/1985 | Sears | 252/62.54 |
| 4,550,054 | 10/1985 | Yamauchi | 212/62.54 |
| 4,613,545 | 9/1986 | Chubachi | 252/62.54 |

Primary Examiner—John F. Niebling
Assistant Examiner—Steven P. Marquis
Attorney, Agent, or Firm—John J. McCormack; Nathan Cass; Kevin R. Peterson

[57] ABSTRACT

A magnetic coating composition is disclosed of the type having magnetic particles dispersed in a resin binder. The improvement comprises the use of a solvent system including a dibasic ester wherein the solvent system has an initial Hansen three-dimensional solubility parameter range of approximately 10.5 to 11.0 and a Hansen three-dimensional solubility parameter range of approximately 9.3 to 10.0 after approximately 99% of the solvent has been evaporated from the binder.

29 Claims, No Drawings

PREPARATION OF MAGNETIC COATING

This application is a continuation of patent application Ser. No. 495,554, filed May 17, 1983 now abandoned.

BACKGROUND OF THE INVENTION

Prior art magnetic coating compositions have been fabricated using both thermoplastic and thermosetting binder systems. Although many of the prior art binder systems exhibit those desirable characteristics for their particular intended uses, most prior art systems exhibit poor durability as measured by either head crash resistance or their ability to withstand physical abrasion. Further, most prior art binder systems exhibit cratering, pinholes, discontinuities in the coating, low signal amplitude, bit-shift, poor overwrite, low resolution, poor signal to noise ratio, poor surface finish, high switching field distribution, low orientation ratios, as well as low magnetic squareness and poor dispersion quality.

Generally, in order to improve one or more of the physical, electrical or magnetic characteristics of the coating, it has been necessary to compromise certain characteristics, the choice being dependent upon the final end use of the coating.

There are many reasons for the above mentioned deficiencies in prior binder compositions. One of the most important is poor dispersion of the magnetic oxide in the coating. For example, the phosphate ester described in this invention produces improved dispersions when compared to other prior art surfactants. Thus, improved magnetic oxide dispersion results in enhanced coating continuity and surface smoothness, which in turn results in an increase in signal amplitude, improved signal to noise ratio and superior magnetic parameters including orientation ratio, switching field distribution and squareness. It was also learned that excessive bit-shift is due to poor dispersion. In addition, most prior art binder systems incorporated a catalyst system based on an amine which cures through the epoxy groups. Solid epxoxy resins claimed in prior art have a high epoxy equivalent which limits the amount of cross linking that can occur. If, however, a Lewis-Acid type catalyst such as an acidic phosphate ester is used, cross linking occurs between the epoxy and phenolic resins which leads to a three dimensional network with improved durability.

It is thus an object of the present invention to provide a magnetic coating composition without the above-recited deficiencies of prior art compositions.

It is yet another object of the present invention to provide a magnetic coating composition which exhibits enhanced dispersion quality characteristics over those compositions of the prior art.

It is yet another object of the present invention to provide a magnetic coating composition exhibiting greater durability, fewer discontinuities, greater signal amplitude as well as improved bit-shift, overwrite, resolution, signal to noise, switching field distribution and magnetic squareness characteristics.

It is still another object of the present invention to provide a magnetic coating composition with an improved dispersant to perform those objects as recited above.

BRIEF DESCRIPTION OF THE INVENTION

The present invention is a magnetic coating composition of the type having magnetic particles dispersed in a resin binder. The improvement comprises the use of a solvent system including a dibasic ester wherein said solvent system has an initial Hansen three-dimensional solubility parameter range of approximately 10.5 to 11.0 and a Hansen three-dimensional solubility parameter of approximately 9.3 to 10.0 after approximately 99% of the solvent has evaporated from the binder.

It has been determined that a magnetic coating composition having the above-recited characteristics can be achieved where said composition contains a phosphate-ester dispersant and a cellosolve/dibasic ester solvent. Further solvents which are capable of use with the phosphate-ester dispersant in yielding the above-recited characteristics are isophorone/dibasic ester and cyclohexanone/dibasic ester.

DETAILED DESCRIPTION OF THE INVENTION

The objects of the present invention are first achieved through the use of a phosphate ester dispersant, which functions in a dual role. Firstly, the preferred binder composition of the present invention is the result of an epoxy-phenolic reaction and the phosphate ester catalyzes such a reaction. The phosphate ester also acts as a dispersant for the magnetic oxide pigment.

The solvent system is also unique. The system allows one to maintain a close control over resin compatibility during coating, orientation and drying. The end result is an extremely smooth continuous coating.

The present invention is not in the resin system, but in the novel combination of a phosphate ester dispersant and specific solvent having previously defined Hansen three-dimensional solubility parameter ranges. However, for the sake of illustration, the following represents a typical coating composition for use in practicing the present invention.

The preparation of the coating involves three separate operations, namely, ball milling, letdown and filtration. The milling step was carried out in a ceramic-lined ball mill loaded to 50% volume with ⅜ inch diameter zirconia cylinders. The milling solution comprised the following:

| Mill Base | Proportions | Solids |
| --- | --- | --- |
| Magnetic Oxide | 34.38 | 34.38 |
| 60% Weight Epon 1004 | 3.27 | 1.96 |
| Cellosolve | 41.94 | — |
| Dibasic Ester | 18.62 | — |
| Gafac RE-610 | 1.79 | 1.79 |
| | 100.00 | 38.13 |

Gafac RE-610 is a reaction product of mono and dibasic esters of orthophosphoric acid and a nonionic surfactant, also known as Igepal available from GAF Corporation. Epon 1004 is a condensation polymer of epichlorohydrin and bisphenol A available from Shell Chemical Co.

The milling solution was charged to the ball mill by adding first the dibasic ester solvent, followed by the 60% Epon 1004 solution in cellosolve, which is monoethyl ether of ethylene glycol. This was followed by the Gafac RE-610 and magnetic iron oxide.

The milling solution was milled for approximately 120 hours at 35°-40° C. in order to achieve the required degree of dispersion.

A letdown composition was then prepared containing the following components:

| Mill Base | Proportions | Solids |
|---|---|---|
| 60% Epon 1004 | 16.51 | 9.91 |
| Methylon 75108 | 5.95 | 5.95 |
| 10% Butvar B-74 | 7.43 | .07 |
| Cellosolve | 8.00 | — |
| Dibasic Ester | 15.58 | — |
| Dow-Corning Paint Additive No. 11 | 0.65 | .07 |
| Alumina | 1.40 | 1.04 |

Methylon resin 75108 is a phenolic resin available from the General Electric Company. Dow-Corning Paint Additive No. 11 is a silicone resin.

The letdown solution was prepared by combining dibasic ester solvent, 60% Epon 1004 in cellosolve, methylon resin 75108, 10% polyvinyl butyral available from Monsanto as B-74 and cellosolve. The resulting solution was stirred for one hour and filtered through an 8 micron absolute filter, the filtrate then slowly added to the mill base over a period of 45-60 minutes with moderate stirring. Finally, the Dow-Corning Paint additive and dispersed alumina in Epon 1004 was added while stirring over a period of 10 minutes.

At this point, the coating was complete except for filtration and viscosity stabilization. The coating was stirred at a high shear for an 18-hour period prior to filtration through a 1 micron nominal and 8 micron absolute filters. After filtration, the coating was allowed to stabilize by stirring or paddling under low shear for at least 24 hours prior to use.

The dibasic esters useful in practicing the present invention are available from E. I. du Pont de Nemours & Co. as mixtures and separate components of three esters, namely, dimethyl succinate, dimethyl glutarate and dimethyl adipate. They possess the general chemical formula of $H_3COOC(CH_2)_X COOCH_3$, where X is an integer from 2 to 4.

Although historically the magnetic disc industry has relied upon epoxy and phenolic resins for their binder systems, there are other resin systems which are possible. The thrust of the present application is the use of a phosphate-ester dispersant and a solvent system having an initial Hansen three-dimensional solubility parameter range of approximately 10.5 to 11.0 and a Hansen three-dimensional solubility parameter range of approximately 9.3 to 10.0 after approximately 99% of the solvent has evaporated from the binder. Preferably, the present invention employs a phosphate-ester dispersant in a cellosolve/dibasic ester solvent to achieve the improved physical properties recited above.

While certain specific embodiments of this invention have been illustrated and described in detail herein, it is obvious that many modifications thereof may be made without departing from the spirit and scope of the invention.

What is claimed is:

1. A method of preparing a phenol-epoxy magnetic disk coating recording composition including magnetic particles dispersed in a phenolic-epoxy resin binder, the method including the steps of: intermixing a solvent with sufficient of a phosphate-ester to both disperse the particles adequately as well as to catalyze sufficient cross-linking of phenolic and epoxy resin to yield a three-dimensional network of enhanced durability; the solvent including a dibasic ester component.

2. The method as recited in claim 1 wherein the solvent system is selected and adapted to exhibit a Hansen three-dimensional solubility above of approximately 10.5, initially, and a Hansen three-dimensional solubility below approximately 10.5 after drying.

3. The method of claim 2 wherein said composition is formulated to contain an acidic phosphate-ester dispersant/catalyst and wherein the dibasic ester solvent also includes cellosolve.

4. The method of claim 3 wherein the phosphate-ester dispersant/catalyst and cellosolve-dibasic ester solvent are selected and arranged to comprise, together, about 5% by weight of the total binder composition.

5. The method of claim 3 wherein the solvent is selected and arranged to exhibit a Hansen three-dimensional solubility of about 10.5-11.0 initially and about 9.3 to 10.0 after approximately 99% of the solvent has evaporated from the binder.

6. The product of the method in claim 3.

7. The method as recited in claim 3 wherein the phosphate ester is selected as the reaction product of mono and dibasic esters of a phosphoric acid and a non-ionic surfactant.

8. The method as recited in claim 7 wherein the phosphate-ester dispersant/catalyst and the cellosolve-dibasic ester solvent are selected and arranged to exhibit a Hansen three-dimensional solubility of about 10.5-11.0 initially and about 9.3 to 10.0 after approximately 99% of the solvent has evaporated from the binder.

9. The combination as recited in claim 7 wherein the dibasic ester component is selected to comprise mixtures and separate components of a di-methyl succinate, a di-methyl glutarate and a di-methyl adipate.

10. The product of the method in claim 2.

11. The method as recited in claim 1 wherein the dibasic ester component is selected to comprise mixtures and separate components of a di-alkyl succinate, a di-alkyl glutarate and a di-alkyl adipate.

12. The product of the method in claim 11.

13. The product of the method in claim 1.

14. A method for formulating a magnetic disk recording coating which has magnetic recording particles dispersed in a phenolic-epoxy resin binder, this method comprising:
   intermixing with a solvent system, a moiety of acidic phosphate ester, sufficient to disperse the particles adequately and also sufficient to so catalyze the cross-linking of phenolic and resin groups as to create a high durability network; the solvent system being selected to include a dibasic ester component.

15. The product of the method in claim 14.

16. A method of preparing a magnetic recording coating composition of the type having magnetic recording particles dispersed in a phenolic-epoxy resin binder, this method comprising mixing a phosphate ester dispersant with a solvent system including a dibasic ester, this solvent system being selected and adapted to exhibit an initial Hansen three-dimensional solubility of approximately 10.5 to 11.0 and a Hansen three-dimensional solubility of approximately 9.3 to 10.0 after approximately 99% of the solvent has evaporated from the binder.

17. The product of the method in claim 16.

18. A method for formulating a magnetic disk recording coating which has magnetic recording particles dispersed in a phenolic-epoxy resin binder, this method comprising:

intermixing with a solvent system, a moiety of acidic phosphate ester, sufficient to disperse the particles adequately and also sufficient to so catalyze the cross-linking of phenolic and resin groups as to create a high durability network.

19. The product of the method in claim 18.

20. A method of preparing a magnetic recording coating composition of the type having particles adapted to high speed magnetic recording dispersed in a phenolic-epoxy resin binder, this method comprising mixing a phosphate ester dispersant with a solvent system, and providing sufficient of the phosphate ester dispersant to both disperse the particles adequately as well as to catalyze sufficient cross-linking of phenolic and epoxy resin to yield a three-dimensional network of enhanced durability.

21. The method of claim 20 wherein said composition solvent contains cellosolve.

22. The method of claim 21 wherein the phosphate-ester dispersant and cellosolve-dibasic ester solvent comprise about 5% of the total binder composition.

23. The product of the method in claim 22.

24. The product of the method in claim 21.

25. The method of claim 20 wherein the dispersant and solvent comprise about 5% of the total binder composition.

26. The product of the method in claim 25.

27. The method of claim 20 wherein said composition is formulated to contain an acidic phosphate-ester dispersant/catalyst and wherein the solvent comprises a dibasic ester.

28. The product of the method in claim 27.

29. The product of the method in claim 20.

* * * * *